A. HUNTER.
Car-Axles.
No. 5,898. Reissued June 2, 1874.
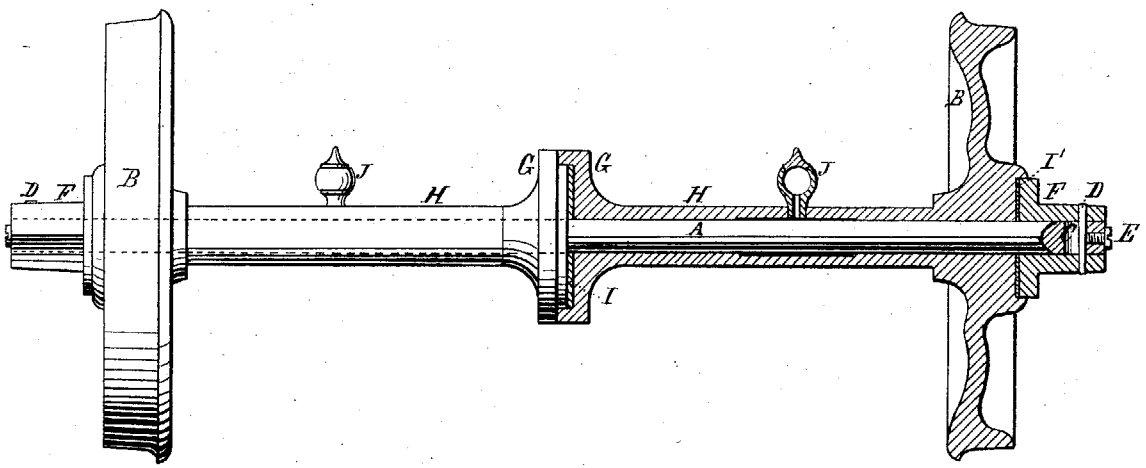
*Witnesses*
Alex. Mahon
A. M. Smith
*Inventor.*
Andrew Hunter.
AM. PHOTO-LITHOGRAPHIC Co. N.Y. (OSBORNE'S PROCESS.)

UNITED STATES PATENT OFFICE.

ANDREW HUNTER, OF QUINCY, ILLINOIS.

IMPROVEMENT IN CAR-AXLES.

Specification forming part of Letters Patent No. 148,705, dated March 17, 1874; reissue No. 5,898, dated June 2, 1874; application filed May 2, 1874.

*To all whom it may concern:*

Be it known that I, ANDREW HUNTER, of Quincy, county of Adams, State of Illinois, have invented certain new and useful Improvements in Car Wheels and Axles, of which the following is a full, clear, and exact description, reference being had to the accompanying drawing, which represents a front elevation, partly in section, of the car-wheel axle and wheels constructed in accordance with my invention.

In the ordinary construction of car wheels and axles in which the wheels are rigidly connected to and turn with the axle, a large amount of friction is created in moving around curves, owing to the fact that one of the wheels is compelled to travel a greater distance than the other, and both being rigid upon a common axle, it is of course impossible for one of the wheels to rotate faster than the other; consequently one or the other of the wheels must slip or slide upon the track, causing it to act as a heavy brake, greatly retarding the progress of the car or train, and, in some instances, causing the flange of the wheel to mount the rail, and thus throw the car off the track. Numerous efforts have been made to overcome this difficulty by applying one or both of the wheels to the axle in such manner as to permit their free rotation relatively to each other; but, owing to the rapid wear due to the constructions heretofore devised for carrying out this plan, the relation of the parts soon becomes disturbed, producing a speedy destruction of the axle and wheels, and necessitating a return to the rigidly-connected wheels. Wheels have also been combined with tubular sleeves placed on the axle in such manner as to permit the independent movement of the wheels; but these sleeves were made to extend out over the ends of the axle and to rotate in the short stationary journal-boxes, and being necessarily made thin, they soon become worn out in the small portion resting in said boxes, and thereby rendered worthless.

The object of my invention is to overcome the difficulties recited; and to this end the invention consists in combining the car-wheels with a stationary through-axle by means of sleeves projecting on the inner sides only of the wheels, and abutting against each other at their inner ends, thus forming a tube or sleeve covering the stationary axle the entire distance between the wheels, while, at the same time, leaving the outer ends of the stationary axle adapted to receive a stationary collar or rigid support, as hereinafter explained. It further consists in providing the inner ends of the independently-rotating wheel sleeves or tubes with enlarged wearing disks or collars for diminishing the wear and increasing the durability of the independently-rotating sleeves, as hereinafter described. It further consists in the combination, with the outer recessed face or sides of the independently-rotating wheels, of stationary collars or supports rigidly connected with or keyed to the outer ends of the stationary axle, as hereinafter explained. The invention further consists in certain details of construction and arrangement, hereinafter fully set forth.

In the accompanying drawing, A represents the car-axle; B B, the wheels, rigidly connected with the outer ends of sleeves H H in any usual manner of uniting car-wheels to the axle. These sleeves H extend inward, and are provided at their inner ends with enlarged wearing-disks G G, one of which is recessed to receive the other, or a projection formed thereon; and within the recess and between the disks G G is placed a metal washer, I, of different metal from the disks G, either harder or softer, as preferred, forming a wearing-surface and giving greater durability to the parts. The outer face or side of the wheel or wheel-hub is recessed to receive a stationary collar, F, provided with an enlarged wearing-disk at its inner end, which fits snugly within the recess in the hub of the wheel; and between said disk and the wheel, within the recess formed in the latter, is placed a washer, I′, similar to that, I, used between the disks G G, and for a similar purpose. The collar F is keyed to the axle A by means of a pin, at D, which passes through a perforation in the collar and through an elongated slot, C, in the axle near its end, as shown. E is a set-screw secured in the end of the axle, its inner end entering the slot C and forming a bearing-surface, against which the outer face of the pin or key D rests, said screw by its adjustment serving to hold the collar up against the wheel and to compensate for wear between the wheel and collar, while the keys D serve to prevent any rotation of the collars F and axle A relatively to each other. The sleeves may be provided, at any suitable points on their inner faces, with recesses for receiving lubricating-oil supplied thereto from oil-cups of any suitable or preferred construction applied to the sleeves, as shown at J.

From the above description of parts it will be seen that the wheels are adapted to move or turn freely and independently of each other upon the stationary axle A, and that, being provided with sleeves extending the entire distance between the wheels and covering the axle, the axle is materially stiffened and strengthened thereby, rendering it practicable to reduce the size and consequent cost of the axle. The use of the long sleeves, which constitute, in effect, a divided axle, increases the extent of the wearing-surface over that of the ordinary car-axle rotating in stationary boxes, inasmuch as the entire length of the axle between the collars F becomes a fixed or stationary wearing-surface or journal, removing the wear from the short collars F, which afford fixed points of attachment to, and support for, the truck. The washers I I′, in connection with the keys D and set-screws E, afford a ready and convenient means for compensating for wear, as the washers, when they become worn, may be readily replaced by new ones, and any slighter wear of the same may be compensated for by the adjustment of the end screws, which serve to prevent end play of the parts and to hold them in proper working relation to each other. The large disks G G at the inner ends of the sleeves H sustain the wear consequent upon the independent movement of the wheels with their respective sleeves relatively to each other, and being enlarged, as described, the wear is distributed over a greatly-extended surface, thereby adding largely to the durability of the sleeves.

Having thus described my invention, what I claim as new, and desire to secure by Letters Patent, is—

1. A stationary car-axle, in combination with the independently-rotating wheels B B, provided with sleeves H, projecting on the inner side of said wheels, and extending the entire length of the axle between the wheels, in such manner as to abut against each other at their inner ends, substantially as described.

2. The independently-rotating sleeves H H, projecting from the inner side of the car-wheels B B, in combination with enlarged wearing-disks G G, formed upon the inner ends of said sleeves, substantially as and for the purpose set forth.

3. The independently-rotating wheels B B, with their sleeves H, in combination with the stationary through-axle A and collar F, keyed to said axle outside the wheels B, substantially as and for the purpose set forth.

4. The combination of the stationary through-axle A, independently-rotating wheels B B, sleeves H, and outer collars F, constructed to operate substantially as and for the purpose set forth.

5. The stationary axle provided near its ends with elongated slots and the keys D for securing the collars F, in combination with the set-screws E, substantially as and for the purpose set forth.

6. The wheels B, recessed upon their outer faces, in combination with the stationary collars F and the intervening washers I′, substantially as described.

Witnesses: ANDREW HUNTER.
ALEX. MAHON,
N. B. SMITH.